(12) United States Patent
Kirby

(10) Patent No.: US 8,578,719 B2
(45) Date of Patent: Nov. 12, 2013

(54) BLEED ASSEMBLY

(75) Inventor: Stuart James Kirby, Derby (GB)

(73) Assignee: Rolls-Royce PLC, London (GB)

( * ) Notice: Subject to any disclaimer, the term of this patent is extended or adjusted under 35 U.S.C. 154(b) by 1106 days.

(21) Appl. No.: 12/585,078

(22) Filed: Sep. 2, 2009

(65) Prior Publication Data

US 2010/0115963 A1 May 13, 2010

(30) Foreign Application Priority Data

Nov. 11, 2008 (GB) .................................... 0820598.1

(51) Int. Cl.
*F02C 6/18* (2006.01)

(52) U.S. Cl.
USPC ............................................. 60/785; 181/268

(58) Field of Classification Search
USPC ............ 60/782, 785; 181/264, 268, 272, 275, 181/213, 214
See application file for complete search history.

(56) References Cited

U.S. PATENT DOCUMENTS

| 1,758,654 | A | * | 5/1930 | Dormeyer ...................... 181/264 |
| 3,195,679 | A | | 7/1965 | Duda et al. |
| 5,899,058 | A | * | 5/1999 | Narcus et al. .................... 60/794 |
| 5,923,003 | A | | 7/1999 | Arcas et al. |
| 5,934,611 | A | * | 8/1999 | Tindell et al. .................. 181/214 |
| 6,588,195 | B2 | * | 7/2003 | Negulescu ....................... 60/785 |
| 6,837,050 | B2 | * | 1/2005 | Mandai et al. ................... 60/725 |
| 7,194,862 | B2 | * | 3/2007 | Sattinger ......................... 60/725 |
| 2001/0042368 | A1 | | 11/2001 | Negulescu |
| 2002/0117224 | A1 | | 8/2002 | Vakili |

FOREIGN PATENT DOCUMENTS

| DE | 28 25 939 | A1 | 1/1980 |
| DE | 44 12 517 | A1 | 10/1995 |
| EP | 0 062 145 | A2 | 10/1982 |
| EP | 1 892 399 | A2 | 2/2008 |
| GB | 356864 | | 9/1931 |
| GB | 890364 | | 2/1962 |
| GB | 2 132 269 | A | 7/1984 |
| GB | 2 405 666 | A | 3/2005 |
| JP | A-2003-58168 | | 2/2003 |
| SU | 1815387 | A1 | 5/1993 |
| WO | WO 03/046358 | A1 | 6/2003 |
| WO | WO 2007/149535 | A1 | 12/2007 |

OTHER PUBLICATIONS

Search Report issued in European Patent Application No. 09 25 2068 dated May 8, 2013.

* cited by examiner

*Primary Examiner* — Ted Kim

(74) *Attorney, Agent, or Firm* — Oliff & Berridge, PLC

(57) ABSTRACT

A noise reduction device 40, for example for use in a bleed assembly 30 of a gas turbine engine, comprises partitions 50, 52 forming cells 54 having apertures 56, 58, 60 which provide contractions and sudden expansions of flow passing through the device. The apertures 56, 58, 60 are disposed relative to each other so as to force the flow to change direction within the cells 54 to break up jets of gas issuing from the apertures 56, 58, 60. Webs 62, 64, 66 may be provided adjacent the apertures 56, 58, 60 to direct flow and to assist in generating turbulence.

12 Claims, 3 Drawing Sheets

BLEED ASSEMBLY

This invention relates to a noise reduction device, and is particularly, although not exclusively, concerned with such a device for use with a bleed valve in a gas turbine engine to release compressed air from a compressor stage to a bypass duct of the engine.

When a gas turbine engine is operating under transient conditions, for example when decelerating, it may be necessary to bleed air at high pressure from the core gas flow through the engine. Such air may be transferred to a bypass flow within the engine. Bleed valves are provided to control this transfer of air. The flow of bleed air from the core gas flow into the bypass flow takes place over a substantial pressure drop, and can generate significant noise. It is therefore usual to provide a noise reduction device in, or at the exit of, the flow passage between the core gas flow and the bypass duct. A typical measure is to discharge the bleed air into the bypass duct through a perforated plate, sometimes referred to as a "pepper pot" as disclosed, for example, in US2001/0042368. The pepper pot serves to break the single body of air flowing towards the bypass duct into a large number of smaller jets which promote small-scale turbulence and hence quicker mixing with the main flow through the bypass duct.

In order to avoid a single large pressure drop and sudden expansion from the high pressure core flow to the bypass flow, two or more pepper pots have been used in series, in order to break the single large pressure drop into a series of smaller pressure drops. Pepper pots are typically made from thin metallic sheets in which holes are formed, for example by laser cutting, and tend to be expensive. If a series of pepper pots are used downstream of a single bleed valve, the cost is multiplied. Also, pepper pots are subjected to high transient pressure drops, and the shock loadings can cause them to deform or disintegrate.

According to the present invention there is provided a bleed assembly for a gas turbine engine, the assembly comprising a noise reduction device for a flow of gas, the assembly comprising a flow passage, a bleed valve at an inlet to the flow passage and a noise reduction body extending across the flow passage, the noise reduction body having a cellular structure comprising partitions which define a plurality of cells which communicate with one another through inlet and outlet apertures in walls of the cells to provide a plurality of flow paths through the noise reduction body, each cell having at least one of the inlet apertures and at least one of the outlet apertures, which inlet and outlet apertures each cause a contraction of the flow through the noise reduction body followed by sudden expansion of flow emerging into or from the respective cell, the apertures having increasing flow cross-sections in the direction of gas flow.

The or each inlet aperture of at least one of the cells may have a flow cross-section which is small relative to the flow cross-section through the respective cell, so that the contracted flow issuing from the inlet aperture has space within the cell to undergo rapid expansion.

The or each inlet aperture of at least one of the cells may be oriented to direct flow issuing from the aperture towards an unapertured region of a wall of the cell. The inlet and outlet apertures of at least one of the cells may be disposed so that flow travelling through the cell from the inlet aperture to the outlet aperture changes direction during passage through the cell. For example, the or each inlet aperture of the cell may be provided in a cell wall which extends perpendicular to another cell wall in which the or each outlet aperture is disposed. Thus, the flow direction through the or each inlet aperture differs from that through the or each outlet aperture.

Alternatively, the inlet and outlet apertures, may be disposed in cell walls that are parallel to each other, with the inlet and outlet apertures offset laterally from one another with respect to the flow direction through the apertures.

Flow directing webs may be situated adjacent at least one of the apertures of at least one of the cells in order to direct flow issuing from the aperture in a desired direction.

Adjacent cells may communicate with each other through a common one of the apertures, which constitutes the outlet aperture of one of the cells and the inlet aperture of the other cell.

The apertures may have increasing flow cross-section in the flow direction through the body in order to accommodate increasing volume flow rates as the gas expands through the cells.

The partitions may be disposed in intersecting arrays to form the cells. The partitions in each array may be parallel to each other, and there may be three arrays in an orthogonal configuration. With such an arrangement, the cells each have a generally parallelepiped form.

The noise reduction body may be manufactured by a stereolithographic process, such as a selective laser sintering process or a laser direct metal deposition process. Such processes enable the manufacture of complex structures, including the partitions and the apertures.

The present invention also provides a bleed valve assembly for a gas turbine engine, the assembly comprising a noise reduction device as defined above, having a bleed valve at an inlet end of the flow passage. The present invention also provides a gas turbine engine having a compressor, a bypass duct, and a bleed valve assembly as defined above, the flow passage extending between the compressor and the bypass duct.

For a better understanding of the present invention, and to show more clearly how it may be carried into effect, reference will now be made, by way of example, to the accompanying drawings, in which.

Figure 2:
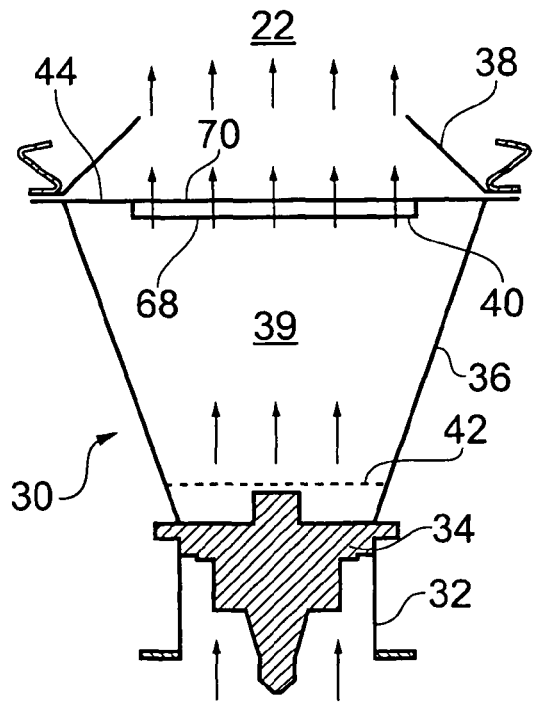
FIG. 2 is a sectional view of a bleed assembly.
Figure 3:
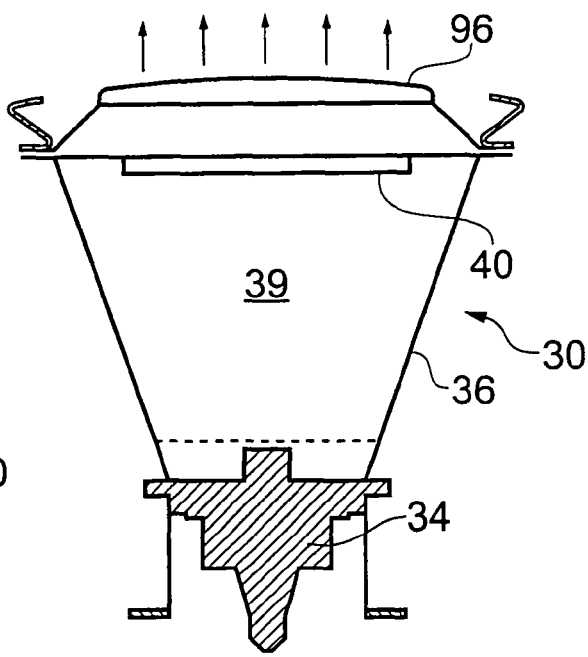
Figure 4:
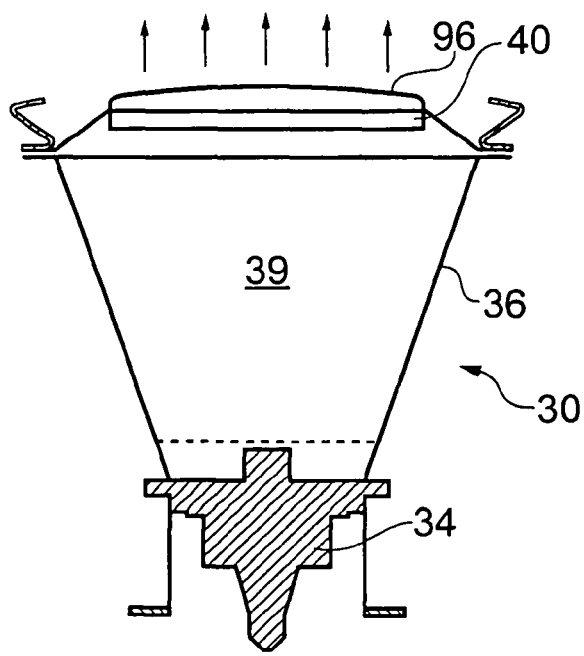
Figure 5:
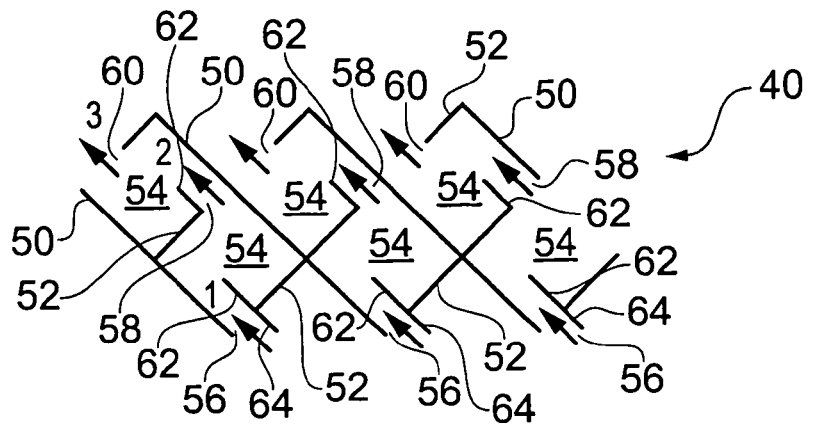
Figure 6:
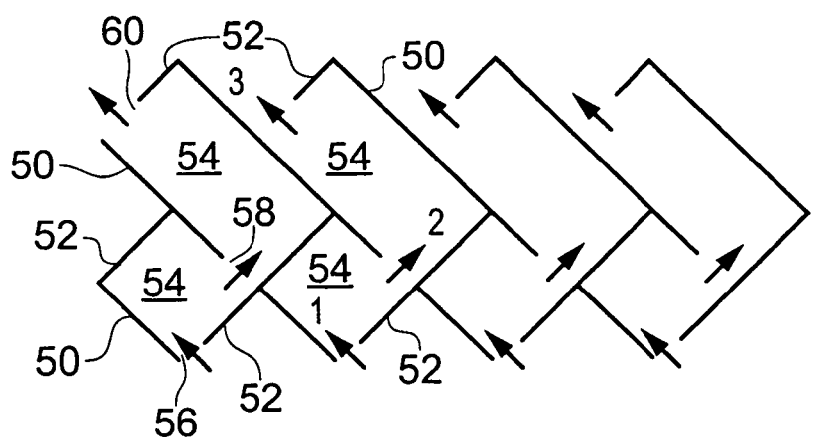
Figure 7:
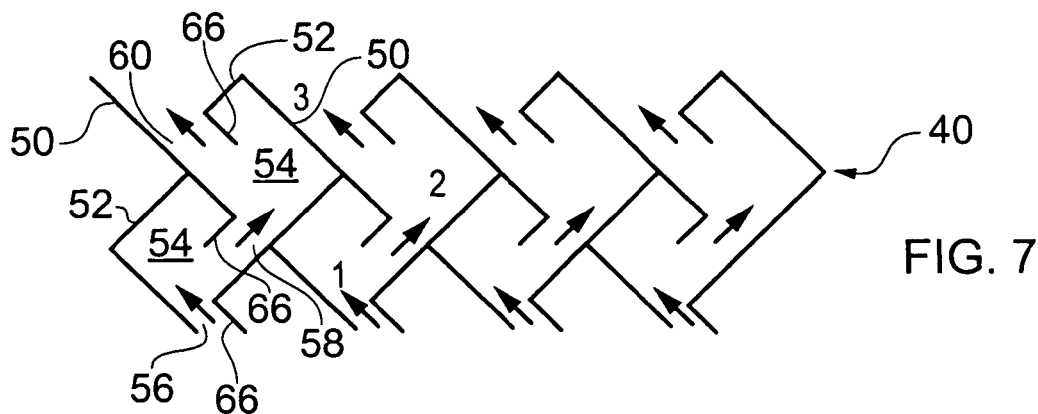
Figure 8:
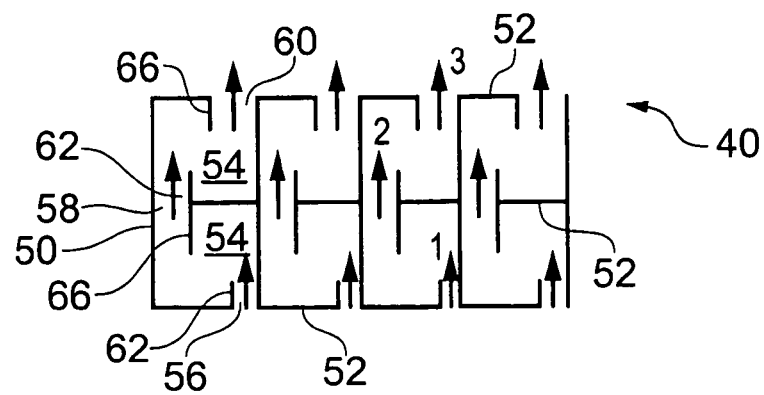

FIGS. 3 and 4 correspond to FIG. 2 but show alternative embodiments of the bleed assembly;

FIG. 5 is a diagrammatic view of a noise reduction body of the device of the bleed assemblies of FIGS. 2 to 4; and FIGS. 6 to 8 are diagrammatic representations of variants of the structure shown in FIG. 5.

Figure 1:
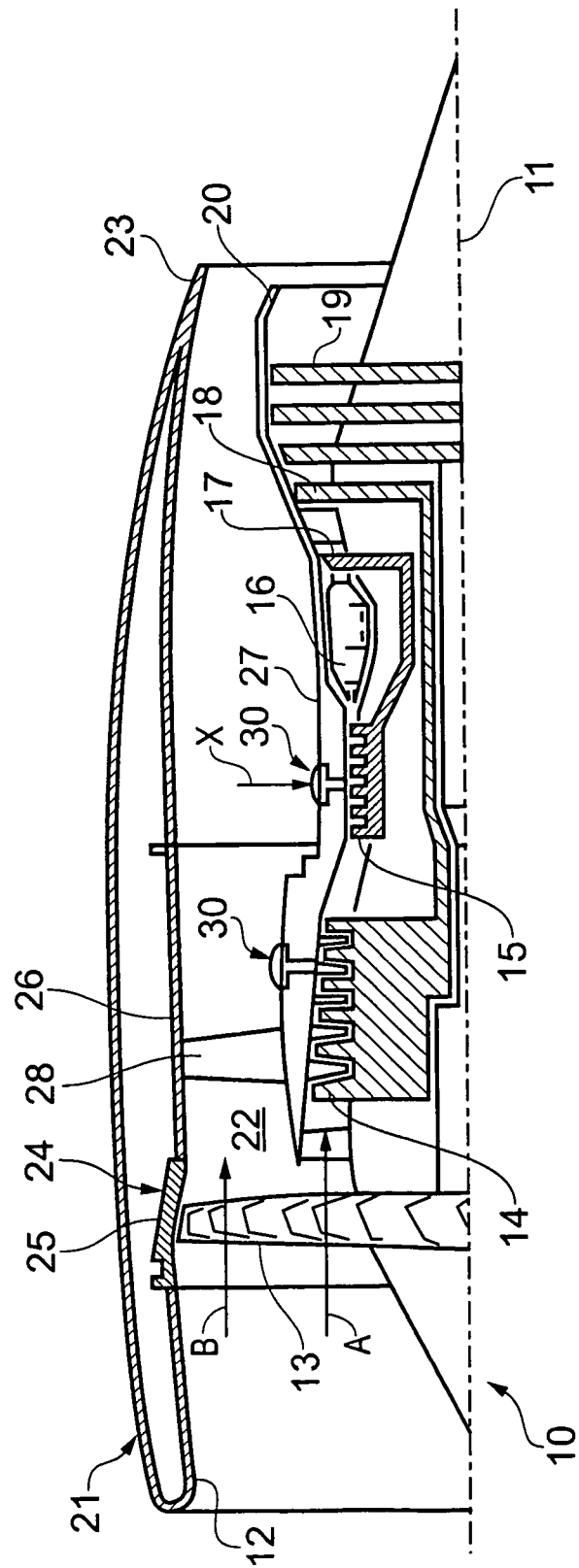
FIG. 1 is a schematic sectional view of a gas turbine engine.

Referring to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached inwardly thereto is a rear fan casing 26.

During engine operations and particularly when changing rotational speed at low power it is important to ensure that the pressure ratio across each compressor 14, 15 remains below a critical working point, otherwise the engine 10 can surge and flow through the engine 10 breaks down. This can cause damage to engine's components as well as aircraft handling problems.

To maintain a preferred pressure difference across a compressor 14, 15, or even just one stage of a compressor 14, 15, bleed assemblies 30 are provided to release pressure from an upstream part of a compressor 14, 15. Operation of a bleed assembly 30 and engine operability are described in "The Jet Engine" 6th Edition, 2005, Rolls-Royce plc, pages 79-80, and details of such operation will therefore only be briefly mentioned herein.

FIG. 2 shows one of the bleed assemblies 30. Each bleed assembly 30 comprises an inlet 32, a bleed valve 34, a duct 36 and an outlet 38. A noise reduction device 40 is situated at the junction between the duct 36 and the outlet 38. The duct 36 and the outlet 38 together define a flow passage 39. Parts of core engine airflow A may be diverted through the bleed assembly 30 by opening the bleed valve 34, such that the bleed airflow enters the inlet 32, passes through the bleed valve 34 and is channelled the flow passage 39 defined by the duct 36 and the outlet 38 into the bypass flow B in the bypass duct 22. There is usually an annular array of bleed valves around the core engine's casing 27.

When the bleed valve 34 is open, one or more high velocity jets of air from the compressor 14 or 15 travel through the bleed duct 36. If these jets of air are discharged directly into the bypass duct 22, the resulting energy transfer between the bleed air and bypass flow B and the turbulence that is created in the bypass flow B, generates substantial noise. In order to avoid this, the noise reducing device 40 is provided.

In the embodiment shown in FIG. 2, a baffle 42 is provided at the exit from the bleed valve 34, and the noise reduction device 40 is in the form of a noise reduction body which is a monolithic component, or cassette, which is supported at the junction between the bleed duct 36 and outlet 38 on a partition 44. The noise reduction body 40 has an inlet face 68 and an outlet face 70.

One configuration of the internal structure of the noise reduction body is illustrated in FIG. 5.

The structure as illustrated in FIG. 5 comprises two perpendicular arrays of partitions 50, 52, the partitions 50, 52 in each array being parallel to one another. The structure also comprises a further array of partitions (not shown) which lie in planes parallel to the plane of the Figure, so that the overall structure comprises intersecting partitions lying parallel to three orthogonal planes. The partitions 50, 52 thus form the walls of cells 54 which, as seen in FIG. 5, have a generally square shape and which consequently, in conjunction with the cell walls constituted by the partitions lying parallel to the plane of the Figure, are of parallelepiped form. The partitions 50, 52 are each angled to the general direction of gas flow through the noise reduction body 40, vertically upwards in the Figure. Apertures 56, 58, 60 are provided in the partitions 52 and constitute inlet and outlet apertures of the respective cells 54. Thus, each cell 54 in the lower row shown in FIG. 5 comprises an inlet aperture 56 and an outlet aperture 58. In turn, the outlet aperture 58 of each cell in the lower row serves as the inlet aperture for the adjacent downstream cell in the upper row. The apertures 60 constitute the outlet apertures for the cells in the upper row.

Adjacent each of the apertures 56 and 58 (ie the apertures which serve as inlet apertures for the cells 54) are provided with webs 62 which extend from the respective apertures 56, 58 into the cells 54 of which they form the inlet apertures Further webs 64, which can be regarded as extensions of the webs 62, extend in the upstream direction from the apertures 56.

In operation, flow from the valve 34 and the baffle plate 42 in FIG. 2 travels along the flow passage 39 and impinges on the lower surface of the noise reduction body 40, and passes through the inlet apertures 56, guided by the webs 64, into the lower row of cells 54 shown in FIG. 5. The apertures 56 causes the flow to contract, and to emerge into the respective cells 54 in the form of jets directed, with the assistance of the webs 62, at an unapertured region of the opposite cell wall constituted by one of the partitions 52. Entry of the jet into the respective cell 54 causes it to expand rapidly, so losing pressure, and to lose kinetic energy owing to the impact of the jet against the opposite cell wall. Furthermore, it will be appreciated that the inlet apertures 56 and outlet apertures 58 of the cells 54 in the lower row as seen in FIG. 5 are laterally offset with respect to one another in the direction of flow through the apertures 56, 58 (as indicated by arrows). The result of this is that gas flowing from the inlet aperture 56 of each cell 54 to the outlet aperture 58 must change direction, so promoting mixing of the jet issuing from the inlet passage 56.

A similar configuration is present in the cells 54 in the upper row as shown in FIG. 5. Again, flow entering each cell 54 through the respective aperture 58 (which for this purpose becomes an inlet aperture) is directed by the web 62 against the opposite cell wall, and is forced to change direction to emerge from the outlet aperture 60.

As mentioned above, each sudden expansion of the flow as it emerges from the respective apertures 56, 58 results in an increase in the volumetric flow rate through the body 40. Consequently, in order to enable this increased volumetric flow rate, the apertures 58 are larger in flow cross-section than the apertures 56, and the apertures 60 are larger again.

It will be appreciated that FIG. 5 shows only a small section of the entire body 40. Also, although only two rows of cells 54 are shown in FIG. 5, so that there are two contractions in the flow followed by rapid expansion into the cells 54, and a further contraction and expansion as the flow passes through the apertures 60, it would be possible for the body 40 to have more than two rows of cells, and a greater number of contractions and rapid expansions.

FIG. 6 shows an alternative configuration for the internal structure of the body 40. In FIG. 6, as in FIGS. 7 and 8, the same reference numbers have been used as in FIG. 5 to designate corresponding features.

In the embodiment of FIG. 6, the upper row of cells 54 are somewhat elongated, so that they are rectangular, rather than square, in the view shown in FIG. 6. Also, the apertures 56, 58 lacks the webs 62, 64 of the embodiment of FIG. 5.

In the embodiment of FIG. 5, flow passes into and out of the cells through apertures 56, 58, 60 in the parallel partitions 52, so that the apertures 56, 58, 60 are oriented in the same direction as each other. In the embodiment of FIG. 6, alternate apertures 56, 58, 60 in the flow direction are in partitions 50, 52 which are inclined to one another. Thus the apertures 58 which provide communication between adjacent cells in the flow direction are in the partitions 50, while the inlet flow to the lower row of cells 54 and the outlet flow from the upper row of cells 54 takes place through the apertures 56, 60 which are disposed in the walls 52. Consequently, flow through the apertures 58 takes place in a direction perpendicular to the flow through the apertures 56 and 60. This means that the inlet flow, through the apertures 56, again is directed towards an unapertured cell wall constituted by part of the respective partition 52, but has to change direction to pass through the outlet aperture 58 of the respective cell. Subsequently, the flow entering the next downstream cell 54 has to change direction again to exit the outlet aperture 60.

Thus, as with the embodiment of FIG. 5, the flow is forced to follow a tortuous path which promotes mixing of the jets emerging from the apertures 56 and 58 into the respective cells 54.

FIG. 7 shows a third embodiment, similar to that of FIG. 6, in which webs 66 project from each aperture 56, 58, 60 in the upstream direction with respect to the normal flow direction indicated by arrows. These webs 66 thus serve initially to guide the flow in the flow passage 39 (FIG. 2) into the first cells 54 through the apertures 56. Subsequently, the respective webs 66 at the apertures 58 and 60 serve to create eddies and other turbulence within the cells 54 so promoting mixing of the jets issuing from the apertures 56 and 58.

FIG. 8 shows an embodiment similar in some respects to that of FIG. 5, in that the flow direction through the apertures 56, 58, 60 is all in the same direction. Again, successive apertures 56, 58 and 58, 60 are laterally offset with respect to each other so that the flow needs to change direction within the cells 54 to move from the inlet apertures 56, 58 to the respective outlet apertures 58, 60.

In the embodiment of FIG. 8, the inlet apertures 56 for the lower row of cells 54 are provided with webs 62 which extend into the respective cell 54 from the respective aperture 56. The apertures 58 in the partition 52 between the two rows of cells 54 are provided both with a web 62 and a web 66, extending into the respective intercommunicating cells 54. Each outlet aperture 60 of the upper row of cells 54 is provided with a web 66 projecting into the respective cell 54.

As a result of this configuration, flow through the apertures 56 is directed at the opposite wall (constituted by the partition 52 between the two rows of cells 54), by the webs 62 at those apertures. The webs 66 create turbulence in the cells 54 in the same manner as the webs 66 in the embodiment of FIG. 7. Subsequently, the webs 62 and 66 at the apertures 58 in the partition 52 between the rows of cells 54 straighten the flow through the apertures 58 and direct it towards the opposite wall of the cell 54 receiving the flow. Turbulence again is introduced by the webs 66 at the outlet apertures 60, and these webs also serve to straighten the flow passing through the apertures 60 into the region downstream of the noise reduction body 40.

It will be appreciated that the partitions 50 in the embodiments of FIGS. 5 to 7 extend obliquely with respect to the general flow direction through the noise reduction body 40. As a result, the partitions 52 extend obliquely with respect to a direction transverse to the general flow direction. As a result, none of the partitions 50, 52 or the webs 62, 64, 66 are parallel to the inlet and outlet faces 68, 70 (see FIG. 2) of the noise reduction body 40. This configuration makes it possible to form the noise reduction body by means of a stereolithographic process, such as selective laser sintering or laser direct metal deposition, sometimes referred to as Powder Bed direct laser deposition (DLD). In such methods, the structure is built up from a base plate, for example a base plate positioned at the bottom of FIG. 5, using a metal powder which is melted by a laser at locations where the structure is to be formed, but which is removed at locations which are not melted. Such processes enable complex internal structures to be formed.

In the embodiment of FIG. 8, the partitions 50 are aligned with the general direction of flow through the body 40, and the partitions 52 extend transversely of this direction, ie parallel to the inlet and outlet faces 68, 70. Such a structure is difficult or impossible to achieve in a stereolithographic process by building up from a base plate parallel to the partitions 52 using current techniques, although the structure may be achievable by building up from a base plate inclined to those partitions. Alternatively, other manufacturing methods may be employed.

In order to reduce the thickness of the body 40 in the general flow direction, it is desirable to form the internal structure in such a way that the flow is accelerated in the apertures to as high a velocity as possible within acceptable noise limits. This usually means acceleration of the flow to high subsonic or low supersonic velocities. However, higher speeds result in greater noise generation, and consequently the number of stages (ie the number of cells in each flow path between one side of the body 40 and the other) is selected to achieve a relatively compact structure while minimising the generation of noise. By forcing the flow to change direction within the cells, the high speed jets issuing from the apertures are mixed in a short space, before they encounter the outlet aperture of the respective cell.

Using structures such as those disclosed in FIGS. 5 to 8, it is possible to construct a noise reduction body 40 with compact dimensions (having a thickness of the order of 10 mm), in a single structure, all or most of which may comprise a monolithic component. The structure has sufficient thickness to have good mechanical properties, including sufficient strength to resist the bending forces created by the pressure differential across the body 40. Similarly, the structure is able to withstand vibration.

The walls may have a maximum span between intersections of the order of 5 mm, which means they can be made relatively thin (for example around 0.3 mm) and light in weight.

FIGS. 3 and 4 show alternative bleed assemblies 30. In the embodiment of FIG. 3, the outlet 38 is closed by a pepper pot diffuser 96, which may be of conventional form. In the embodiment of FIG. 4, the noise reducing device 40 and the pepper pot 96 are integrated into a single cassette, simplifying the manufacture of the bleed assembly, with a reduced number of components. In the embodiments of FIGS. 3 and 4, the pepper pot 96 could be replaced by a vaned outlet, or otherwise suitably configured to control the plume entering the bypass duct by directing the flow in a desired direction or pattern.

The invention claimed is:
1. A bleed assembly for a gas turbine engine that in operation provides a flow of gas, the assembly comprising:
  a flow passage,
  a bleed valve at an inlet to the flow passage, and
  a noise reduction body extending across the flow passage,
    the noise reduction body having a cellular structure that includes partitions which define a plurality of cells which communicate with one another through inlet and outlet apertures in walls of the cells to provide a plurality of flow paths through the noise reduction body, each cell having at least one of the inlet apertures and at least one of the outlet apertures, the inlet and outlet apertures each causing a contraction of the flow through the noise reduction body followed by sudden expansion of flow emerging into or from the respective cell, and the apertures having increasing flow cross-sections in the direction of gas flow.

2. The bleed assembly as claimed in claim 1, wherein the at least one inlet aperture of at least one of the cells has a flow cross-section which is small relative to the flow cross-section through the respective cell.

3. The bleed assembly as claimed in claim 1, wherein the at least one inlet aperture of at least one of the cells is oriented to direct flow through the at least one inlet aperture towards an unapertured region of the cell wall.

4. The bleed assembly as claimed in claim 1, wherein the at least one inlet aperture and the at least one outlet aperture of at least one of the cells are disposed so that flow from the at least one inlet aperture to the at least one outlet aperture changes direction during passage through the cell.

5. The bleed assembly as claimed in claim 1, wherein the at least one inlet aperture of at least one of the cells is disposed in a cell wall which is perpendicular to a cell wall in which the at least one outlet aperture of that cell is disposed.

6. The bleed assembly as claimed in claim 1, wherein the at least one inlet aperture of at least one of the cells is disposed in a cell wall which is parallel to a cell wall in which the at least one outlet aperture of that cell is disposed, the inlet and outlet apertures of that cell being offset laterally from each other with respect to the flow direction through the apertures.

7. The bleed assembly as claimed in claim 1, further comprising a flow directing web situated adjacent at least one of the apertures.

8. The bleed assembly as claimed in claim 1, wherein adjacent cells communicate with each other via a common aperture constituting the outlet aperture of one of the adjacent cells and the inlet aperture of the other of the adjacent cells.

9. The bleed assembly as claimed in claim 1, wherein the partitions are disposed in intersecting arrays to form the cells.

10. The bleed assembly as claimed in claim 9, wherein the partitions in each array are parallel to each other.

11. The bleed assembly as claimed in claim 1, wherein the noise reduction body is manufactured by a stereolithographic process.

12. A gas turbine engine, comprising:
a compressor,
a bypass duct, and
the bleed assembly in accordance with claim 1,
wherein the flow passage extends between the compressor and the bypass duct.

* * * * *